Jan. 6, 1970   P. LAMORLETTE   3,488,688
CHRONOMETRIC PREPAYMENT METER
Filed Dec. 13, 1967   2 Sheets-Sheet 2

United States Patent Office 3,488,688
Patented Jan. 6, 1970

3,488,688
CHRONOMETRIC PREPAYMENT METER
Paul Lamorlette, Paris, France, assignor to L'Eclairage des Vehicules sur Rail (E.V.R.), Paris, France, a corporation of France
Filed Dec. 13, 1967, Ser. No. 690,274
Claims priority, application France, Dec. 13, 1966, 87,323
Int. Cl. G07f 5/10
U.S. Cl. 194—1          4 Claims

ABSTRACT OF THE DISCLOSURE

A chronometric prepayment apparatus in the form of an electromechanical chronometric meter having starting and resetting means responsive to the introduction of coins and a removable case carried by the apparatus for housing an electrochemical generator which is detachably coupled to said meter.

---

The present invention is applicable more particularly to devices for the payment of charges for parking vehicles, but it will be apparent that it is also applicable to other apparatus, such as, for example, chronometric meters mounted on telescopes situated in tourist centers.

The devices for receiving payment of parking fees are generally constructed in the form of chronometric meters arranged on posts of about three to four and a half feet in height, situated on the edge of the pavement.

These chronometric meters have to be zeroized on the arrival of a vehicle, and zeroizing is to be effected only against payment by the insertion of one or more coins.

Among these devices, generally known as "parking meters," there are two main types:

"Automatic" parking meters which comprise a device for winding the meter spring, the energy necessary for winding being supplied by the force applied for the insertion of the coin. The coin then passes into an identification and monitoring device, and then into a device causing the zeroizing and starting of the meter. If the coin is considered to be unsuitable, it is automatically rejected, and the meter is not started.

"Non-automatic" parking meters which comprise an energy storage device in the form of a spring which is either wound periodically by the officials who look after the installation, or by the user himself who, after inserting a coin, has to turn a handle. The action on this handle causes not only winding but the zeroizing of the meter needle and the starting of the meter.

These known parking meters have a certain number of disadvantages. In fact, the mechanism of automatic parking meters is very delicate in design and very fragile, since a very slight displacement of a mechanical part has to permit accumulating sufficient energy to operate the meter for a relatively long period of time.

The non-automatic parking meter, comprising a handle actuated by the user himself, is often criticised owing to the fact that the users who normally use automatic parking meters may forget to operate the handle.

Generally, the apparatus which are most in favour are those which comprise a periodic winding device operated by the attendants employed to supervise the equipment.

This latter type of parking meter, however, has the disadvantage of complicating the work of the attendant and consequently reducing the number of parking meters for which the attendant is responsible.

The parking meter according to the present invention makes it possible to obviate the disadvantages afforded by all the parking meters of the types described hereinbefore.

According to the present invention, the parking meter comprises a chronometric meter actuated by an electromechanical device and a removable money box comprising a source of electrical energy.

According to another feature of the present invention, the aforesaid electrical energy source is a preferably rechargeable electrochemical generator.

According to another feature of the present invention, the parking meter comprises an electromechanical device for identifying and determining the suitability of coins, the said electromechanical device being supplied with electrical current by the said electrochemical generator.

According to another feature of the present invention, the said electrochemical generator is arranged in a sealing-tight compartment arranged in the said removable money box.

Figure 1:
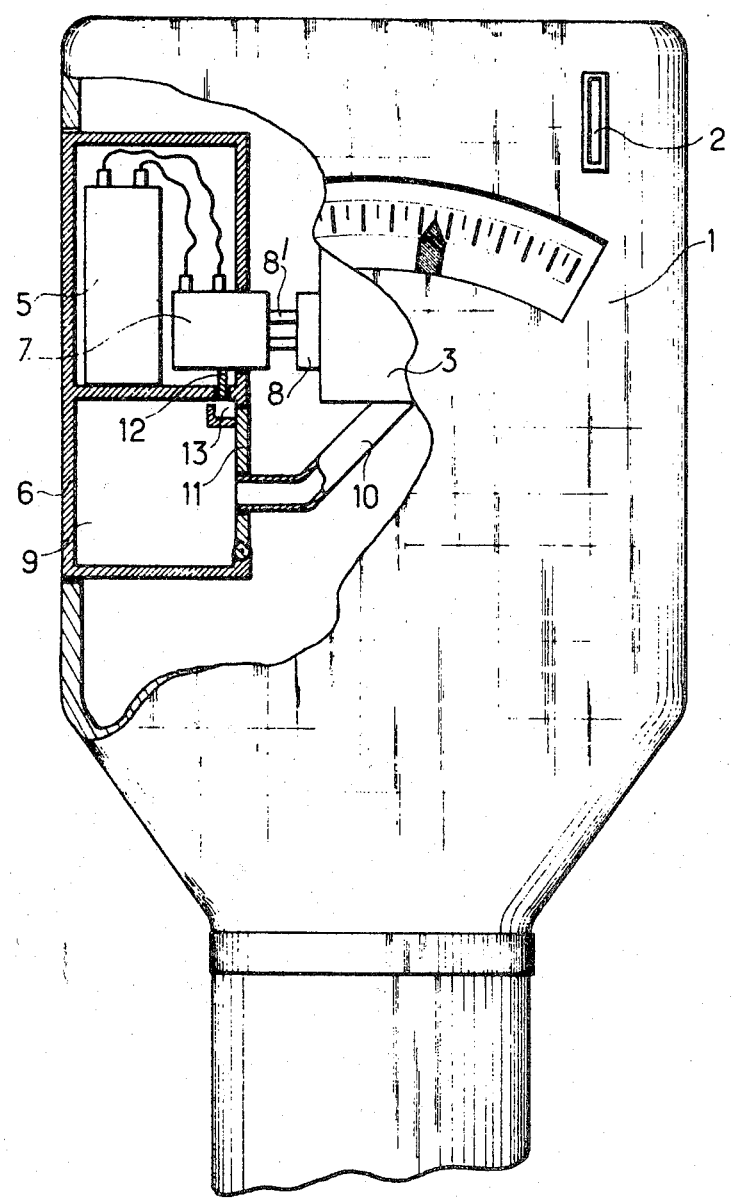
FIGURE 1 is a diagrammatic illustration of a parking meter employing the device of the present invention.

A chronometric meter 1 comprises a slot 2 into which the user has to insert a coin which is received by a device 3 which is capable of checking whether the coin is in conformity with requirements and comprises an electromechanical device for zeroizing and starting a chronometer which comprises a pointer indicating the amount of time which elapses.

According to the present invention the device 3 is an electromechanical device supplied with electrical energy from an electrochemical generator 5 such as a primary cell or storage cell. This generator is arranged within a detachable case 6 which is fixed to the meter 1 by any desired locking device not shown in the drawing.

The detachable case 6 comprises an electrical connection device 7 which co-operates with a connection device 8 associated with the element 3. For reasons which will be brought out later, the co-operation between the devices 7 and 8 is effected by pins 8' carried by the element 3.

Figure 2B:
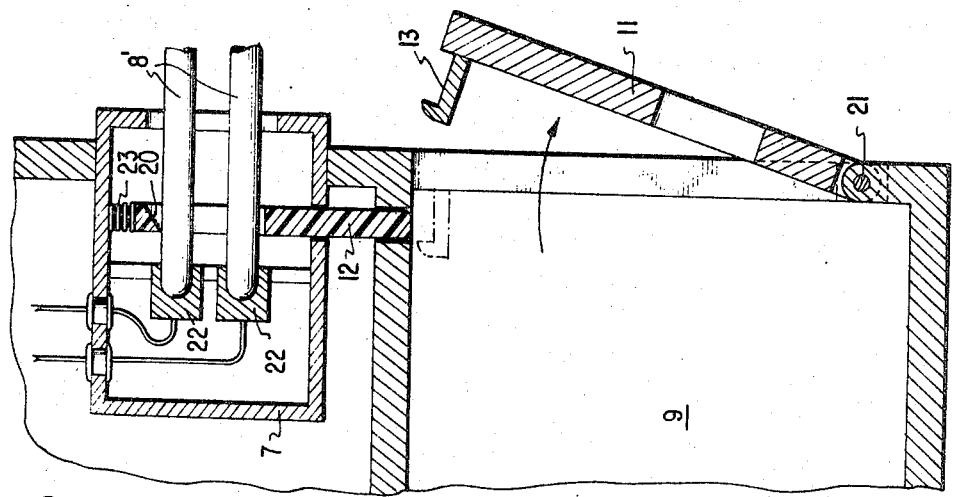
FIGURES 2A and 2B are sectional views disclosing the construction and operation of the connection device of the present invention.
Figure 2A:
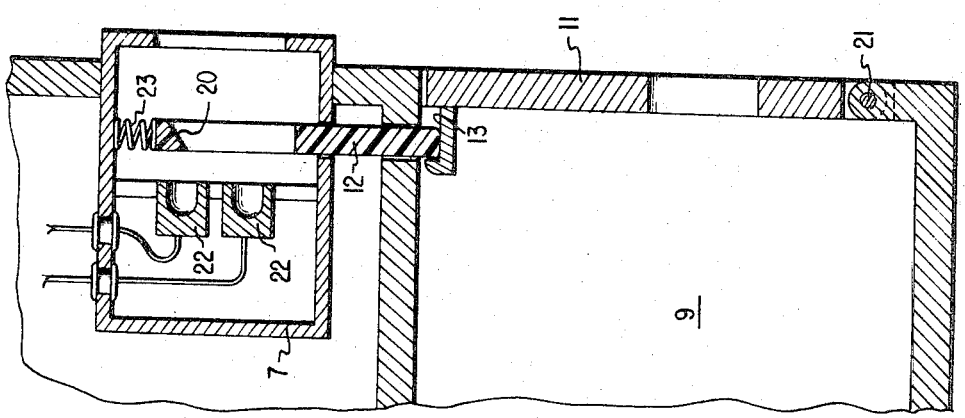

The case 6 comprises a compartment 9 which serves as a money box for collecting the coins which are inserted in the slot 2 and are then guided by a duct 10. The money box compartment 9 can comprise a shutter 11 the opening of which enables the coins to be removed. This shutter can comprise any desired locking system. According to one form of embodiment of the invention the connection device 7 comprises a peg 12 which is actuated by the introduction of the pins 8'. The end of one of the pins 8' engages cam 20 formed in peg 12 and forces it upward as viewed in FIGURE 2B thus withdrawing the peg 12 from the housing 13 and permitting shutter 11 to swing outwardly. The pins 8' make an electrical connection with sockets 22 upon their continual insertion passed peg 12 to thereby connect the electrochemical generator 5 with the electromechanical device 3. When pins 8' are withdrawn, the peg 12 pushed by a spring 23 enters a housing 13 arranged in the shutter 11, thus locking the latter.

With a parking meter according to the present invention, the only upkeep necessary is the collection of coins and the recharging of the electrochemical generators.

These two operations are carried out by the attendant whose job it is to collect the parking fees, and the only work he will have to carry out is to withdraw the case 6 from the parking meter and replace it by a case with an empty money box compartment and with a charged generator. The removed cases are then stored for example at the central accounts department on racks comprising pins co-operating with the connection device 7 and connected to means for recharging the electrochemical generators.

When the money box is provided with a locking or safety closure element which cannot be opened except by an unlocking device arranged on the rack, the plugging of the money box on to the rack will open the money box and connect the device for recharging the generator at the same time. One example of a locking system has been described, and it will be apparent that other systems may be used within the framework of the present invention.

The parking meter according to the invention, therefore, comprises a source of energy the capacity of which can be adapted to the maximum operating time of the parking meter, that is to say to the coin capacity of the said money box.

What is claimed is:

1. In a chronometric prepayment apparatus including an electromechanical chronometric meter having starting and resetting means responsive to the introduction of coins, the improvement comprising: a removable case carried by said apparatus and having first and second compartments, an electrochemical generator carried by said first compartment with said second compartment acting to store inserted coins, connecting means carried by said case for detachably connecting said generator and electromechanical meter, and means carried by said apparatus for guiding coins introduced therein through an aperture in said second compartment.

2. The apparatus as claimed in claim 1 further including a movable shutter carried by said second compartment to allow access to said stored coins and means carried by said removable case for locking said shutter in compartment closed position when said case is removed from said apparatus.

3. The apparatus as claimed in claim 2 wherein said locking means is operatively coupled to said connecting means for detachably connecting said generator to said electromechanical meter.

4. The apparatus as claimed in claim 2 wherein said connecting means includes a pin carried thereby in retracted position in response to connecting said generator to said electromechanical meter and wherein said shutter includes a pin receiving recess.

References Cited

UNITED STATES PATENTS

| | | | |
|---|---|---|---|
| 1,965,066 | 7/1934 | Babson | 58—141 X |
| 2,015,411 | 9/1935 | Riley | 194—9 X |
| 2,078,136 | 4/1937 | Gumm | 58—141 |
| 2,150,509 | 3/1939 | Landrum | 194—9 |
| 2,483,805 | 10/1949 | Broussard et al. | 232—1 |
| 2,604,259 | 7/1952 | Anderson | 232—15 |
| 2,656,908 | 10/1953 | Ellison | 58—142 X |
| 2,802,621 | 8/1957 | Woodruff | 232—15 |
| 3,254,175 | 5/1966 | Todd | 58—142 X |

SAMUEL F. COLEMAN, Primary Examiner